United States Patent
Spence

Patent Number: 5,153,603
Date of Patent: Oct. 6, 1992

[54] SELF-CONTAINED ALCOHOL RECORDER PURGING AND CLEANING SYSTEM FOR DIRECT WRITING TYPE TRACE RECORDERS

[75] Inventor: Michael J. Spence, Santa Maria, Calif.

[73] Assignee: General Dynamics Corporation, Space Systems Division, San Diego, Calif.

[21] Appl. No.: 698,890

[22] Filed: May 13, 1991

[51] Int. Cl.$^5$ .......................................... G01D 15/16
[52] U.S. Cl. ...................................... 346/1.1; 346/75; 346/140 R
[58] Field of Search ........................ 346/1.1, 75, 140 R

[56] References Cited

U.S. PATENT DOCUMENTS

| | | | |
|---|---|---|---|
| 4,050,078 | 9/1977 | Isayama et al. | 346/140 R |
| 4,080,608 | 3/1978 | Stoneburner et al. | 346/75 |
| 4,123,761 | 10/1978 | Kimura et al. | 346/140 R |
| 4,291,317 | 9/1981 | Corwin et al. | 346/140 R |

*Primary Examiner*—Benjamin R. Fuller
*Assistant Examiner*—Gerald E. Preston
*Attorney, Agent, or Firm*—John R. Duncan; Frank D. Gilliam

[57] ABSTRACT

A self-contained alcohol purging and cleaning system for direct writing type trace recorders utilizes a source of compressed air, a tank of R-22 refrigerant and a tank of isopropyl alcohol. A main supply line tube may have its inlet port end selectively connected to either the source of the compressed air or the R-22 tank. The outlet port end of the main supply line tube is connected to the inlet port of the alcohol tank. A first elongated tubing member has its one end connected to the outlet port of the alcohol tank and its free output port end may be detachably connected to inlet end of an output hose whose outlet end is detachably connected to the ink supply manifold of a direct writing type trace recorder. By opening various valves of the system, pressurized gas passing through the main supply line tube forces the isopropyl alcohol into the ink supply manifold and out through its outlet ports until thickened ink is purged and the isopropyl alcohol flowing therefrom is reasonably clear. The output port end of the first elongated tubing member is then disconnected from the inlet end of the output hose and the output port end of a second elongated tubing member is detachably connected thereto. The inlet end of the second elongated tubing member is connected to the outlet port of the main supply line tube so that compressed gases may be used to purge any residual alcohol from the ink supply manifold. The manner for flushing aging and thickened ink from the analog pens would be similar to the steps used in flushing the ink supply manifold.

11 Claims, 1 Drawing Sheet

SELF-CONTAINED ALCOHOL RECORDER PURGING AND CLEANING SYSTEM FOR DIRECT WRITING TYPE TRACE RECORDERS

BACKGROUND OF THE INVENTION

The present invention relates to direct writing type trace recorders (for example such as the Brush trace recorders) and more specifically to a self-contained alcohol purging and cleaning system for flushing aging and thickened ink from the ink supply manifold and the analog pens of the direct writing type trace recorder.

Presently, one of the continuing maintenance problems of direct writing type trace recorders is the fact that the ink used in them ages and thickens in the ink supply manifold and analog pens. In order to purge the aging and thickened ink that plugs the aforementioned hardware it is necessary to disassemble and clean the respective hardware. Oftentimes this results in a loss of the pen adjustment.

It is an object of the invention to provide a novel purging and cleaning system for direct writing type trace recorders that eliminates the need to disassemble the recorder.

It is also an object of the invention to provide a novel self-contained purging and cleaning system for direct writing type trace recorders that forces isopropyl alcohol through the ink supply manifold and analog pens to purge aging and thickened ink therefrom.

It is another object of the invention to provide a novel self-contained purging and cleaning system for direct writing type trace recorders that drastically reduces the time and amount of labor to purge aging and thickened ink from the ink supply manifold and analog pens of the direct writing type trace recorder.

It is further object of the invention to provide a novel purging and cleaning system for direct writing type trace recorders that is compact, portable, and easy to use.

SUMMARY OF THE INVENTION

The novel self-contained alcohol recorder purging and cleaning system for direct writing type trace recorders has been designed to be compact, portable, and easy to use. The system uses refrigerant R-22 or compressed air as a propellant to force isopropyl alcohol through the ink supply manifold and analog pens of the direct writing type trace recorder to purge aging and thickened ink that plugs the aforementioned hardware and leads to subsequent problems. The job of cleaning the ink supply manifold and analog pens of a direct writing type trace recorder formerly took more than a whole day. By use of applicant's novel system, the job can be completed in approximately one hour. The system can be used without recorder disassembly or loss of pen adjustment. The amount of pressure utilized within the system is relatively low (125 PSI) and this reduces replacement costs.

Three of the important components of the system are: a source of compressed air, a tank filled with R-22 refrigerant, and a tank filled with isopropyl alcohol. A main supply line tube has its input end connected to the respective sources of pressurized gases. The output end of the main supply line tube is connected to a secondary tubing member that is attached to the inlet port of the alcohol tank. The outlet port of the alcohol tank also has a primary tubing member connected to it which has an output port at its other end. Several values are positioned in the respective main supply line tube and the other previously discussed tubing members. A supply pressure gauge and a regulator having its own pressure gauge are also connected to the main supply line tube. An output pressure gauge is connected to the primary tubing member that exits the alcohol tank. The aforementioned structure allows compressed air or refrigerant R-22 to be used as a propellant to force isopropyl alcohol through the primary tubing member that exits the alcohol tank.

The direct writing type trace recorder has an ink supply pump that is connected to the ink supply manifold. A plurality of curly-Q tubes are also connected between the ink supply manifold and the analog pens. In order to purge aging and thickened ink that plugs the hardware of the trace recorder, it is necessary to disconnect tubing from the ink supply manifold that comes from the ink supply pump. It is also necessary to disconnect the curly-Q tubes from each of the outlet ports of the ink supply manifold and to close each the valves for these ports. A connecting hose then has its inlet end attached to the output port of the tubing member coming from the alcohol tank and its outlet end connected to the input port for the ink supply manifold. By opening the alcohol supply valve, the isopropyl alcohol is forced under pressure into the ink supply manifold and one outlet port valve at a time can be opened until the thickened ink is purged and the isopropyl alcohol is reasonably clear and then that outlet port valve may be closed and the next one opened to repeat the procedure. This is repeated until the entire manifold has been purged. Next the alcohol in the primary tubing member can be drained by opening the vent valve in another connected tubing member. The output hose is then disconnected at the alcohol output fitting and reattached to the gas output fitting and a gas valve in that tubing member is opened to purge residual alcohol from the ink supply manifold. The same procedure is used for purging the curly-Q tubing and analog pens by first sending the isopropyl alcohol through them and then sending pressurized gas through them to purge any residual alcohol in them.

DESCRIPTION OF THE PREFERRED EMBODIMENT

Figure 1:
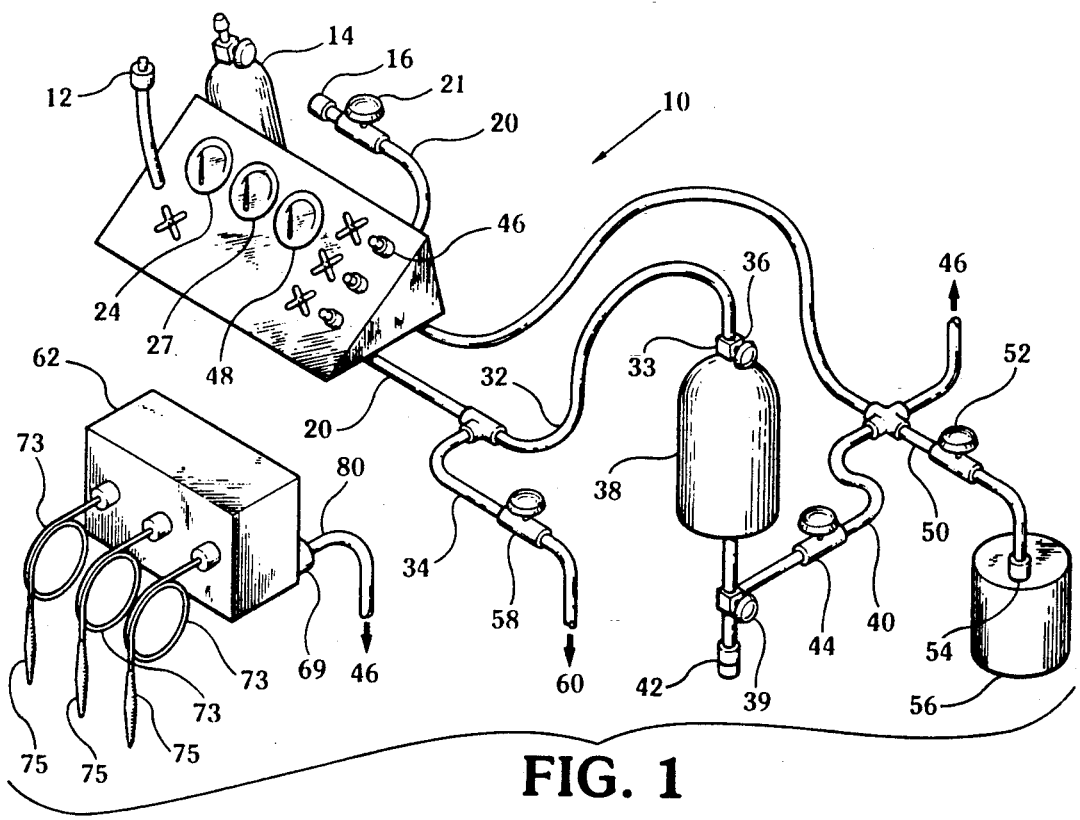
FIG. 1 is a front perspective view of applicant's novel self-contained alcohol purging and cleansing system for brush type trace recorders.
Figure 2:
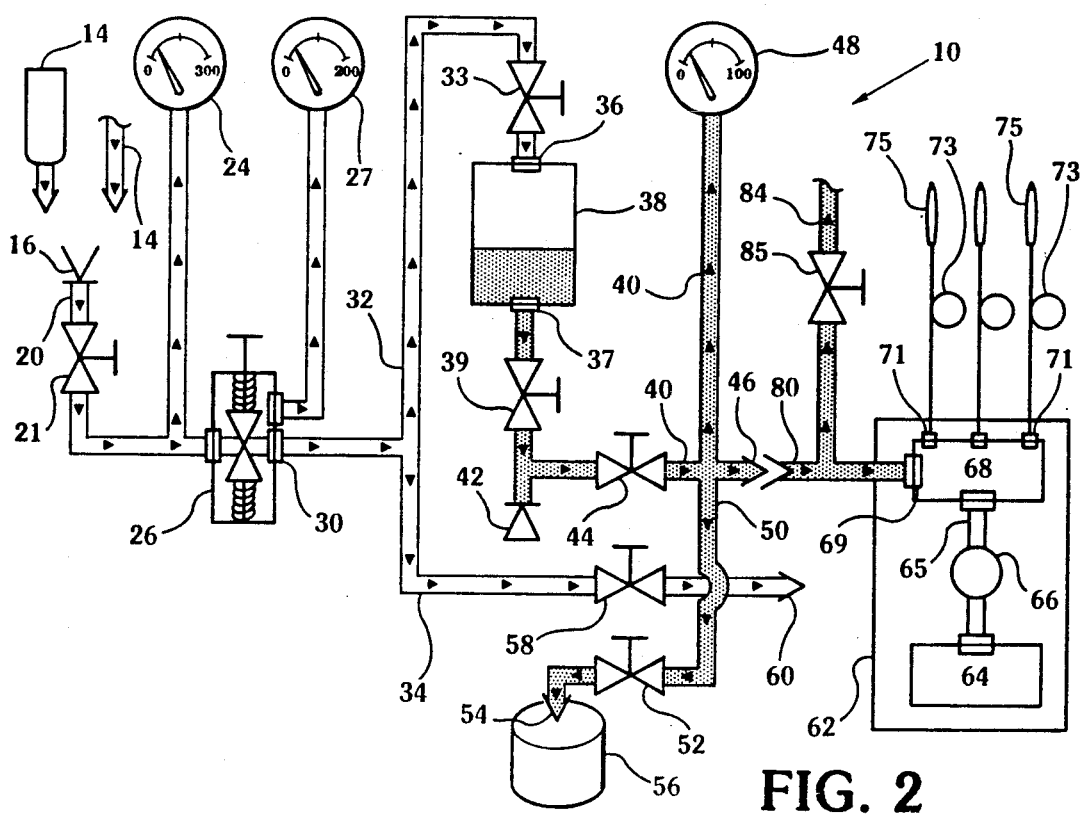
FIG. 2 is a schematic diagram of the structure of the system illustrating the manner in which its components are interconnected to each other.

Applicant's novel self-contained alcohol recorder purging and cleansing system for direct writing type trace recorders with now be described by referring to FIGS. 1 and 2. The system is generally designated numeral 10.

Shop compressor air 12 or R-22 refrigerant tank 14 are optionally connected to main supply line tube 20 at quick-disconnect fitting 16. A main supply valve 21 controls the pressure of the gases in main supply line tube 20 and this pressure can be read on supply pressure gauge 24. A regulator 26 having a pressure gauge 27 is also connected in main supply line tube 20.

The outlet port 30 of press regulator 26 is connected to secondary tubing member 32 and tubing member 34.

Secondary tubing member 32 has a valve 33 mounted therein and its outlet end is connected to inlet port 36 of alcohol tank 38. Alcohol tank 38 has an outlet port 37 and a tank bottom valve 39 connected to a primary tubing member 40 that has an alcohol tank fill port 42 and an alcohol supply valve 44. Primary tubing member 40 has an outlet port 46 and an output pressure gauge 48 is also connected thereto. Tubing member 50 is connected to primary tubing member 40 and it has a vent valve 52 and an output port 54 which allows the alcohol in tubing members 40 and 50 to be vented into a drain tank 56. Tubing member 34 has a gas valve 58 and an output port 60.

A direct writing type trace recorder 62 has an ink reservoir 64 connected to a tube 65 having a pump 66 therein. The outlet end tube 65 is connected to ink supply manifold 68 at inlet port 69. A plurality of exit ports 71 of ink supply manifold 68 are connected to curly-Q tubes 73 that are in turn connected to analog pens 75. Output hose 80 has its one end alternatively connected to output port 46 for the isopropyl alcohol and later it is connected to output port 60 for pressurized gas flow. The other end of output hose 80 is connected to input port 69 to purge the ink supply manifold 68. A capillary tube 84 having a hand valve 85 has its output end sequentially connected to the curly-Q tubes 73 for purging the analog pens 75.

What is claimed is:

1. A self-contained alcohol purging and cleaning system for direct writing type trace recorders comprising:
   an elongated main supply line tube having an inlet port and an outlet port:
   a source of compressed air:
   means for detachably connecting said source of compressed air to the inlet port of said main supply line tube;
   an alcohol tank having an inlet port and an outlet port;
   means connecting the outlet port of said main supply line tube to the inlet port of said alcohol tank;
   a first elongated tubing member having a front end and a rear end, said rear end being connected to the output port of said alcohol tank; and
   means for detachably connecting the front end of said first elongated tubing member to the ink supply manifold of a direct writing type trace recorder.

2. A self-contained alcohol purging and cleaning system for direct writing type trace recorders as recited in claim 1 further comprising an R-22 refrigerant tank and means for detachably connecting said tank to the inlet port of said main supply line tube.

3. A self-contained alcohol purging and cleaning system for direct writing type trace recorders as recited in claim 1 further comprising a second elongated tubing member having a front end and a rear end, said rear end being connected to said main supply line tube, a gas valve mounted in said second elongated tubing member that may be selectively opened to allow compressed gases in said main supply line tube to be vented to atmosphere.

4. A self-contained alcohol purging and cleaning system for direct writing type trace recorders as recited in claim 1 further comprising a third elongated tubing member having a front end and a rear end, said rear end being connected to said first elongated tubing member, a vent valve mounted in said third elongated tubing member that may be selectively opened to allow alcohol in said first elongated tubing member to be vented into a drain tank.

5. A self-contained alcohol purging and cleaning system for direct writing type trace recorders as recited in claim 1 further comprising a pressure regulator in said main supply line tube for controlling the pressure of the compressed air being introduced into said alcohol tank.

6. A self-contained alcohol purging and cleaning system for direct writing type recorders as recited in claim 1 further comprising a pressure gauge connected to said first elongated tubing member for monitoring the pressure of the compressed gas to the ink supply manifold of a brush type trace recorder.

7. A self-contained alcohol purging and cleaning system for direct writing type trace recorders as recited in claim 1 wherein each of said recorders comprise a plurality of analog pens and said means for detachably connecting said first elongated tubing member to the ink supply manifold of one of said direct writing type trace recorders comprises an elongated output hose having first and second ends a capillary tube having first and second ends connected intermediate said first and second ends of said first elongated tubing member, a hand valve is mounted in said capillary tube intermediate the ends of said capillary tube and said hand valve may be electively opened to control the flow of alcohol through each of said plurality of analog pens of a direct writing type trace recorder when said plurality of analog pens are being flushed clean.

8. A self-contained alcohol purging and cleaning system for direct writing type trace recorders comprising:
   an elongated main supply line tube having an inlet port and an outlet port;
   a tank of pressurized R-22 refrigerant;
   means for detachably connecting said pressurized R-22 refrigerant to the inlet port of said main supply line tube;
   an alcohol tank having an inlet port and an outlet port;
   means connecting the outlet port of said main supply line tube to the inlet port of said alcohol tank;
   a first elongated tubing member having a front end and a rear end, said rear end being connected to the outlet port of said alcohol tank; and
   means for detachably connecting the front end of said first elongated tubing member to the ink supply manifold of a direct writing type trace recorder.

9. A self-contained alcohol purging and cleaning system for direct writing type trace recorders as recited in claim 8 further comprising a source of compressed air and means for detachably connecting said compressed air to the inlet port of said main supply line tube.

10. A method of flushing aging and thickened ink from an ink supply manifold and analog pens of a direct writing type trace recorder comprising the following steps:
    a) employing a purging and cleaning system comprising a source of pressurized gas connected by a main supply tube to an inlet port of an isopropyl alcohol tank having input and output ports, a first elongated tubing member having first and second ends with said first end connected to said outlet port of the isopropyl alcohol tank and second end having an outlet port;
    b) take said direct writing type trace recorder and disconnect from said ink supply manifold the ink supply line from an ink supply pump, also disconnecting from the ink supply manifold all of a plurality of curly-Q tubes that run to the analog pens;

c) attaching said second end said first elongated tubing member to said ink supply manifold and flushing the interior and pen shutoff ports with isopropyl alcohol that is being forced through said first elongated tubing member by pressurized gas from the system.

11. A method of flushing aging and thickened ink from the ink supply manifold and analog pens of a direct writing type trace recorder as recited in claim 10 wherein said purging and cleaning system also has a second elongated tubing member having a first and second end with said first end of said second elongated tubing member connected to said main supply line tube and said second end having an outlet port and the following steps take place:

d) said second end of the first elongated tubing member is disconnected from the ink supply manifold and the second end of said second elongated tubing member is connected to the ink supply manifold and pressurized gas is fed therethrough to purge residual alcohol from said manifold.

* * * * *